United States Patent Office 2,996,244
Patented Aug. 15, 1961

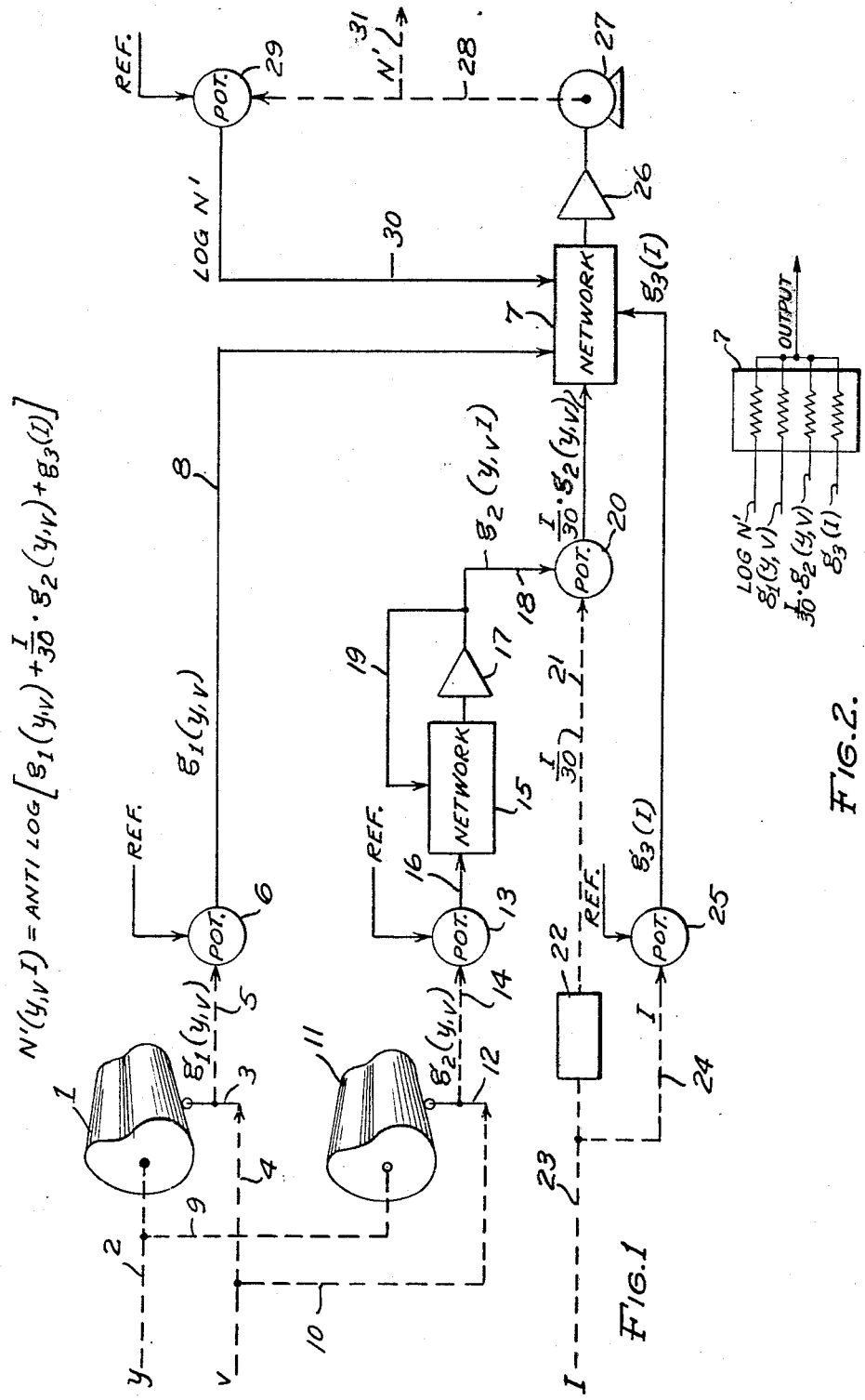

2,996,244
BOMB BALLISTICS MECHANISM
Sidney Kissin, Brooklyn, N.Y., assignor to Sperry Rand Corporation, Ford Instrument Company Division, Long Island City, N.Y., a corporation of Delaware
Filed Mar. 13, 1957, Ser. No. 645,863
1 Claim. (Cl. 235—61.5)

This invention relates to a computer which is capable of accurately generating functions of more than two independent variables.

Difficulty has been encountered in mechanizing directly functions of three or more independent variables due to the operatic limitations of conventional computing components which are basically designed to mechanize functions of one and two variables. This invention proposes to provide a computer which yields an accurate approximation of a function having three variables by mechanizing a mathematically derived compound function of one and two variables. The mechanization of the compound functions utilizes standard components such as cams and potentiometers. The following description is of one embodiment of the invention which is a mechanization of bomb ballistics tables, but it is understood that the concept of invention contemplates the solution of tabular functions of three or more variables without restriction as to application or an assumed set of conditions for establishing the compound function to be mechanized.

A more complete understanding of the invention may be obtained on reading the following detailed description in conjunction with the drawings in which FIG. 1 shows schematically a mechanization designed for accurate computation of a function of three variables and FIG. 2 shows an adding network capable of functioning in a nulling servo loop in which the sum of three inputs is processed for transmittal.

The primary ballistic output requirement for air to ground bombing is range lag, N, expressed as a function of three variables, viz., release air speed, V, release altitude above target, Y, and release dive angle, I. The problem lies in approximating $N(y, v, I)$ by a function $N'(y, v, I)$ which is a compound function of one and two variables. In this particular application a solution for $N'(y, v, I)$ is found as follows:

A family of curves is selected, on a trial and error basis, and is given by (1) $\qquad N' = s_1(90-I)e^{s_2 I}$ where $s_1$ and $s_2$ are arbitrary.

The arbitrary quantities $s_1$ and $s_2$ are determined by the following assumed conditions:

When
$$I = 0, N' = N(y, v, 0)$$
and when
$$I = 30°, N' = N(y, v, 30°)$$

the following expressions for $s_1$ and $s_2$ obtain:

(2) $\qquad S_1 = N\dfrac{(y,v,0)}{90}$ (3) $\qquad S_2 = \dfrac{\ln \dfrac{3}{2} \dfrac{N(y,v,30°)}{N(y,v,0°)}}{30}$ The resulting approximation is therefore (4)
$$N'(y, v, I) = N(y, v, 0°)\frac{3}{2}\frac{N(y, v, 30°)^{\frac{I}{30}}}{N(y, v, 0°)}\left(1 - \frac{I}{90}\right)$$

providing, essentially, an interpolation for values of dive angle between 0°, 30°, and 90°, when $N'=N$.

It is seen that for the condition $I=90°$, $N'=0$.
The final expression to be mechanized can be put in the form (5)
$$N'(y, v, I) = \text{anti log}\left[g_1(y, v) + \frac{I}{30}g_2(y, v) + g_3(I)\right]$$

It has been found that a large variation in ballistic coefficient will not cause significant variations in $g_2$ or $g_3$. Therefore, large variations can be taken care of by only a change of $g_1$ represented in the mechanization by a three dimensional cam.

In the foregoing equations the computed range lag N' is equal to actual range for 0° and 30° dive angle. It is apparent that this equivalence can be predicated for some other arbitrarily selected angle or angles in which case the constants $S_1$ and $S_2$ would have different expressions from that given in the above derivation. However, for the assumed conditions the derived equation is mechanized as follows:

A three dimensional cam 1 is mounted on shaft 2 which is settable in accordance with altitude, y. Follower 3 is positioned by shaft 4 in accordance with release velocity v and is in driven connection with shaft 5. The cam 1 is designed to yield a function, $g_1(y, v)$ which is introduced to reference potentiometer 6. Adding network 7 receives on its first leg the electrical equivalent of the functional quantity $g_1(y, v)$ on lead 8, which connects the potentiometer 6 and the network 7. As shown in FIG. 2, the network 7 comprises a parallel network of four equal ohm resistors which is a standard component in this art.

Shafts 9 and 10 are connected to the shafts 2 and 4, respectively. The shaft 9 is employed to drive in rotation a second three dimensional cam 11 and the shaft 10 is used to position a cam follower 12 axially along the cam 11 which is designed to yield the function $g_2(y, v)$. Reference potentiometer 13 receives the function $g_2(y, v)$ on shaft 14 placing its electrical equivalent into adding network 15 by means of lead 16. The output of the network 15 is employed to control amplifier 17 whose output on lead 18 is returned to the network by nulling lead 19. The lead 18 is used to energize potentiometer 20 which is driven by shaft 21 on which there is represented the quantity $I/30$. The adding network 15 in conjunction with the amplifier 17 and nulling lead 19 serve to assure that the output of the potentiometer 13 is fully introduced to the potentiometer 20. That is, when the amplified output of the network 15 on the nulling lead 19, which is the quantity $g_2(y, v')$ introduced to the potentiometer 20, the network 15 will be nulled and the identity of the output of the potentiometer 13 and the input to the potentiometer 20 is established. The shaft 21 is driven from gear ratio box 22 having an input shaft 23 which is settable in accordance with the quantity I. The output of potentiometer 20, $(I/30)g_2(y, v)$, is placed onto a second leg of the network 7.

Shaft 24 is in driven connection with shaft 23 and is employed to drive function potentiometer 25 which is wound to generate the function $g_3(I)$. Values of this function are placed into a third leg of the network 7.

Amplifier 26 is controlled by the output of the network 7 and drives servo motor 27 having an output shaft 28. The shaft 28 drives a potentiometer 29 which is adapted to compute logarithms of its input. The potentiometer is connected by lead 30 to the network 7 which is nulled when its output produces the anti log of its added inputs in accordance with Equation 5. The output N' of the closed loop system, which includes the network 7 and the potentiometer 29, appears on shaft 31 connected to the shaft 28. Accordingly, it is seen that Equation 5 is mechanized to give values of range lag approximating the true values shown in the ballistics tables.

What is claimed is:

A special purpose computer comprising three computer lines arranged in parallel disposition, a three-dimensional cam in each of two of said lines, said cams having interconnected cam rotating shafts and interconnected cam follower positioning shafts, a potentiometer arranged to receive the output of each of said cams for the purpose of converting their mechanical output to a corresponding electrical quantity, a third potentiometer connected to the output of one of said potentiometers, ratio determining means for driving said third potentiometer according to a predetermined coefficient constant, a third computing line, a function generating potentiometer disposed in the third computer line, said driving means and said function generating potentiometer having interconnected input shafts, an adding network disposed in the output of the three computer lines and a servo loop connected to said adding network, said servo loop comprising a servo amplifier, servo motor and a logarithm computing potentiometer whereby said servo loop is enabled to compute an anti-log of the quantity summed in said adding network.

References Cited in the file of this patent

UNITED STATES PATENTS

| 2,609,729 | Wilkenson et al. | Sept. 9, 1952 |
| 2,736,878 | Boyle | Feb. 28, 1956 |

OTHER REFERENCES

Robb et al.: Some Electronic Analogue Computer Techniques, The University of Connecticut Engineering Experiment Station, January 1953, #9, page 15 relied on.